April 19, 1932. W. FOURNESS 1,854,467

AUTOMATIC CHECK VALVE

Filed June 8, 1926

Inventor
Wilfred Fourness
by John Flam
Attorney

Patented Apr. 19, 1932

1,854,467

UNITED STATES PATENT OFFICE

WILFRED FOURNESS, OF PASADENA, CALIFORNIA, ASSIGNOR, BY MESNE ASSIGNMENTS, TO FOURNESS DEVELOPMENT CORPORATION LTD., OF NEW YORK, N. Y., A CORPORATION OF NEW YORK

AUTOMATIC CHECK VALVE

Application filed June 8, 1926. Serial No. 114,458.

This invention relates to valves, and more particularly to valves that can be used in connection with mechanical refrigerating systems.

In such systems, use is made of a refrigerant, such as sulphur dioxide, which passes through a regular cycle; this cycle includes compression, condensation, and finally expansion in an expansion chamber, with an attendant vaporization and absorption of heat. The chamber is thereby cooled, and serves as a source of cooling, by being placed in or near the space it is desired to cool, as the ordinary house refrigerator, or other types of ice boxes.

In order to compress the refrigerant, a compressor is used, which takes the expanded refrigerant from the expansion chamber, and passes it in a compressed state, to a condenser. The operation of the compressor is not continuous; for the refrigerant can for a short time collect in the expansion chamber. In fact, automatic controls are sometimes used, which operate to shut down the compressor intermittently, and which may respond to variations in fluid pressure, or to temperature, or other functions of the system.

When the compressor is shut down either in response to the operation of such automatic controls, or for any other reason, there is a tendency for the high pressure side of the compressor to transmit fluid pressures in a reverse direction through the compressor valves. Such action would reduce the partial vacuum in the expansion chamber, and thereby the refrigerating effect of the refrigerant. In order to obviate this, a check valve must be installed in the connection between the compressor and the expansion chamber. It is one of the objects of my invention to provide a simple and efficient check valve that operates automatically to prevent back pressure in this connection.

It is another object of my invention to provide an automatic check valve that is simple to manufacture.

It is still another object of my invention to provide a compact unitary device that serves not only as a check valve, but also to provide an oiling connection, as well as a connection for a pressure gauge.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings.

Figure 1:
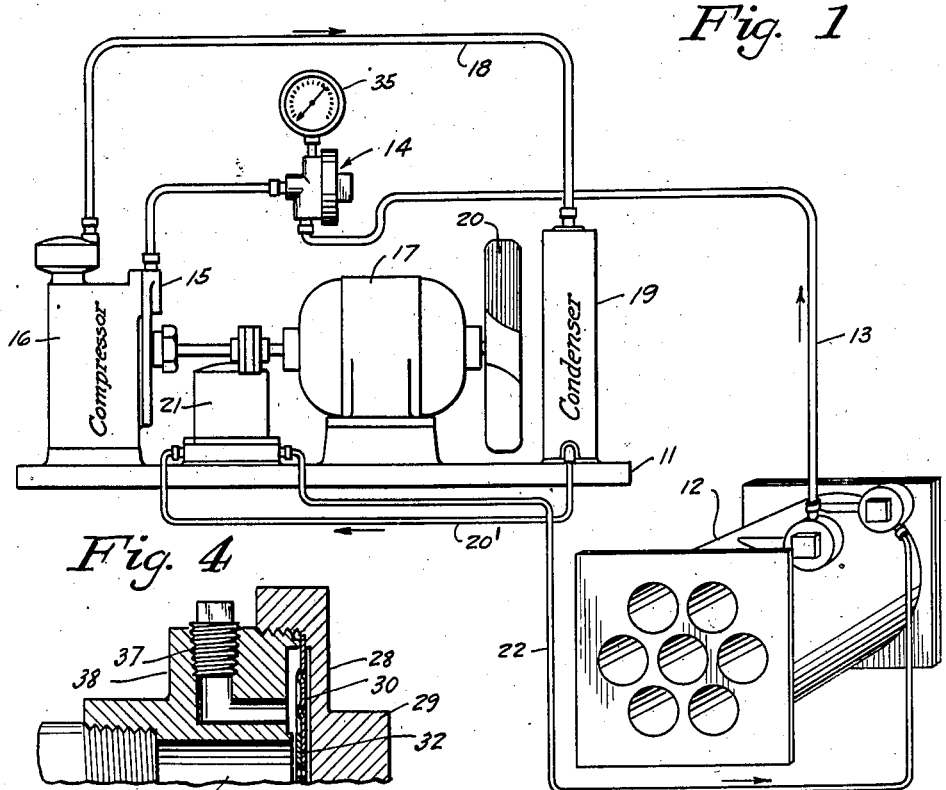
Figure 1 is a schematic diagram of a refrigerating system embodying my invention.

In Fig. 1 I illustrate a refrigerating system, in which most of the apparatus is mounted on a base 11. This base can be placed for example on top of an ice box, while the expansion chamber 12 can be located within the space to be cooled. This expansion chamber, although novel, is not claimed herein, for it is described and claimed in a copending application filed May 15, 1926, in my name, having Serial Number 109,346, and entitled "Refrigerating system." Further description thereof is therefore unnecessary.

The refrigerant, after expansion, leaves chamber 12 through a conduit 13, whence it passes through the check valve structure 14, into the intake 15 of a compressor 16, mounted on base 11. This compressor is arranged to be driven by a small electric motor 17, also mounted on the base 11. The compressed refrigerant is then passed through conduit 18, to a condenser 19, where it is cooled and liquefied. A fan 20, driven by motor 17, serves to provide a cooling draft for the condenser, which purposely has a large radiating surface, it being preferably built like the conventional automobile radiator.

Figure 4:
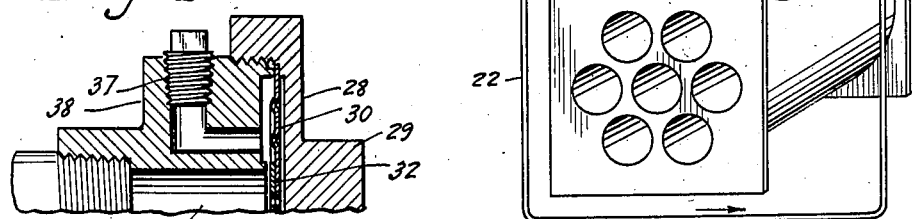
Fig. 4 is a sectional view, taken along plane 4—4 of Fig. 3.
Figure 2:
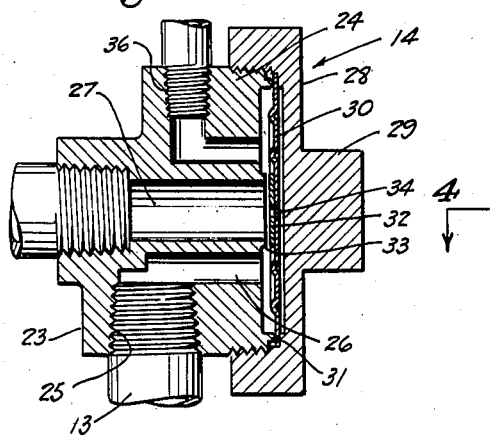
Fig. 2 is a cross sectional view of a check valve embodying my invention.
Figure 3:
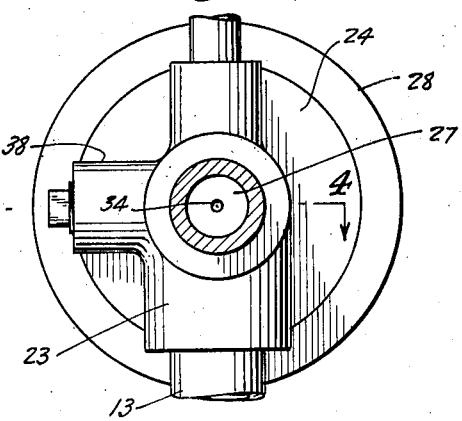
Fig. 3 is an end view thereof.

The condensed refrigerant is passed from the condenser 19 through conduit 20', to a controlling device 21, such as a float valve, controlling the passage of refrigerant to the intake of chamber 12 through conduit 22. In this chamber, a sudden expansion of the refrigerant takes place, the compressor 16 keeping the pressure within the chamber at a low value, and there is consequent rapid absorption of heat by the refrigerant. The cycle is then repeated; the chamber is substantially continuously supplied with the condensed refrigerant. The system as described is of a well-known type, and is set forth here only for the purpose of defining a particular application of my improved check valve structure 14. This valve structure is shown in detail in Figs. 2, 3 and 4.

The body 23 of the valve structure can be a casting, at one end of which is a circular flange 24. The conduit 13 connects into an aperture 25 as by screw threads. The bottom of the aperture connects with a bore 26 opening into the flanged top of casting 23. The outlet to the compressor from aperture 26 is accomplished through a central bore 27, and in order to form a connecting tight passageway between the openings 26 and 27, use is made of a cap 28, threaded over the flange 24, beneath which cap the openings 26 and 27 project. This cap has a square boss 29, by the aid of which it can be tightened upon the flange.

While compressor 16 is in operation, suction exists in passages 26 and 27; but as soon as the compressor stops, there is danger that fluid pressure would be exerted from passageway 27 to passageway 26. In order to check such action, and to interrupt the connection, I provide a simple device, such as a diaphragm 30, which responds automatically to the back pressure. This diaphragm can be corrugated to obtain greater flexibility, and can be confined at its edge between the circular projection 31 on flange 24, and the bottom of cap 28. This diaphragm carries at its center a valve closure member 32, of soft solder or the like, adapted to seat upon the raised edge 33 of aperture 27. While there is no back pressure, the fluid pressure on both sides of the diaphragm is kept uniform, due to the provision of the aperture 34 passing through the member 32 and the diaphragm 30. The positions of the various parts are then that pictured in Fig. 2. The closure 32 is slightly spaced from the edge 33, permitting communication between the two apertures 26 and 27; and diaphragm 30 is in its normal, unflexed position.

Now, if a back pressure exists, the high pressure is soon communicated to that side of diaphragm 30 which is adjacent the cap 28, through aperture 34. This pressure is quickly built up, due to the fact that there is but a small space between the diaphragm and the cap 28. On the other hand, the pressure on the other side of the diaphragm cannot build up rapidly, since the entire expansion space is in communication with it. For this reason, the diaphragm 30 is very quickly depressed in response to this difference in pressure, and closure 32 is pulled against the raised edge 33. Once the closure 32 is thus seated, it is kept there by the back pressure, and until the compressor starts operating.

The check valve operation is useful no matter what the cause of the back pressure. The casting 23 can serve also to provide a connection for a pressure gauge 35, by the aid of a tapped opening 36 connecting below diaphragm 30. A similar opening 37 in a boss 38 can be normally plugged, and can be used to introduce oil into the compressor. When oil is passed into this opening, the suction of the compressor serves to draw it into the mechanism through opening 27. It is thus seen that a convenient means is provided for performing a plurality of functions, such as to provide a check valve, a gauge connection, and an oiling opening for the compressor.

I claim:

1. In combination, means forming a pair of connected passageways, an unbiased diaphragm arranged over at least one of said passageways, means defining a restricted space over that side of the diaphragm which is farthest from the passageways, and a closure member for said one of the passageways, said closure member being carried by the diaphragm, and said closure and diaphragm having an aperture for establishing communication between the space and said passageway.

2. In a check valve, means forming a pair of passageways, one of said passageways forming an intake port for the valve, and the other an outlet port, said ports serving to pass fluid through the valve from intake to outlet, a diaphragm over the outlet port, a valve for closing the said port carried by the diaphragm, and means defining a closely restricted space over that side of the diaphragm which is farthest from said port, there being a connection between said space and the port through an aperture in the valve and the diaphragm, the restricted space being so small that pressure can build up therein upon a reversal of fluid flow faster than the pressure on the other side of the diaphragm.

3. In a valve, means defining a pair of parallel openings, an unbiased diaphragm arranged over the openings, means confining the diaphragm at its edge so as to form a closed path between the two openings, and also to form a restricted space on the other side of the diaphragm, and a closure member carried by the diaphragm over one of said openings, said closure and diaphragm having an aperture connecting said one of the openings with the space above the diaphragm.

4. In a valve that operates to pass fluid in one direction only, means forming an outlet port and an inlet port, a diaphragm arranged over both ports and carrying a closure to interrupt the passage between the two ports, and means defining with the diaphragm a restricted space in constant communication with the outlet port, so that upon reversal of fluid flow the fluid will build up, a pressure in said space urging the diaphragm to closing position, said space being so small that the pressure builds up therein faster than in the inlet port when the fluid reverses.

5. In a valve structure, means defining a pair of chambers, said means including a partition between the chambers that is movable in response to pressure variations, one of said chambers being closely restricted, the other chamber having an inlet and an outlet passageway, said partition being adapted to be acted upon solely by pressures in said passageways and said partition being adapted to restrict the closely restricted chamber and to cause the volume of said chamber to become substantially reduced during normal operation of the valve, a closure member carried by the partition for interrupting communication between the two passageways, when pressure in the restricted chamber causes the partition to move, said outlet passageway being in constant communication through the partition with the restricted chamber, whereby pressure in this passageway above that in the other passageway, will maintain the closure in interrupting position.

In testimony whereof I have hereunto set my hand.

WILFRED FOURNESS.